Patented Mar. 7, 1933

1,900,507

UNITED STATES PATENT OFFICE

WILLIAM W. LEWERS, OF FLINT, MICHIGAN, AND GEORGE L. SCHWARTZ, OF WILMINGTON, DELAWARE, ASSIGNORS TO E. I. DU PONT DE NEMOURS & COMPANY, OF WILMINGTON, DELAWARE, A CORPORATION OF DELAWARE

CELLULOSE ETHER COMPOSITION

No Drawing. Application filed June 12, 1929. Serial No. 370,457.

This invention relates to the art of cellulose ether compositions, and more particularly to cellulose ether compositions modified by the addition of various softening or plasticizing ingredients.

For use in the plastic and allied arts it has been proposed to substitute the ethers of cellulose, for example, ethyl cellulose, in place of nitrocellulose and other cellulose esters. However, in spite of the known advantages of the cellulose ethers, their use has not become general partly because of certain faults in the properties of the final product, e. g. the film, when a cellulose ether is used alone or in the mixtures or combinations heretofore proposed. In particular it has been found that the normal cellulose ether film lacks the toughness and resistance to water penetration desirable for many purposes, such as for lacquers, enamels and other coating compositions.

We have discovered that compositions having the above and other desirable characteristics may be produced by combining with the cellulose ether a non-solvent softener for the cellulose ether and, where a clear product is desired, by also incorporating a solvent for the cellulose ether, said solvent being substantially non-volatile and compatible with the non-solvent softener.

It is therefore an object of this invention to provide cellulose ether compositions capable of producing films, or other solid products, having a high resistance to water penetration.

It is another object of this invention to provide cellulose ether compositions in which the normal properties of the cellulose ether film are favorably modified by the addition of suitable softeners, the films becoming thereby suitable for various requirements of the arts.

With the above and other objects in view, which will be apparent as the description proceeds, we have set forth our invention in the following specificaton and have included the following examples by way of illustration and not as a limitation.

EXAMPLE 1

Coating composition

| | Parts by weight |
|---|---|
| Ethyl cellulose | 10.0 |
| Liquid petrolatum | 1.6 |
| Dibutyl phthalate | 0.4 |
| Toluene | 90.0 |
| | 102.0 |

EXAMPLE 2

Coating composition

| | Parts by weight |
|---|---|
| Ethyl cellulose | 10.0 |
| Liquid petrolatum | 1.5 |
| Dibutyl phthalate | 0.5 |
| Ester gum | 5.0 |
| Toluene | 90.0 |
| | 107.0 |

EXAMPLE 3

Coating composition

| | Parts by weight |
|---|---|
| Ethyl cellulose | 10.0 |
| Liquid petrolatum | 2.0 |
| Ester gum | 5.0 |
| Toluene | 90.0 |
| | 107.0 |

EXAMPLE 4

Coating composition

| | Parts by weight |
|---|---|
| Ethyl cellulose | 10.0 |
| Liquid petrolatum | 1.6 |
| Benzophenone | 0.4 |
| Ester gum | 5.0 |
| Toluene | 90.0 |
| | 107.0 |

Example 5

*Coating composition*

| | Parts by weight |
|---|---|
| Ethyl cellulose | 10.0 |
| Liquid petrolatum | 1.6 |
| Acetyl laurin | .2 |
| Dibutyl phthalate | .2 |
| Ester gum | 5.0 |
| Ethylene dichloride | 90.0 |
| | 107.0 |

Example 6

*Plastic composition*

| | Parts by weight |
|---|---|
| Ethyl cellulose | 40.0 |
| Liquid petrolatum | 6.0 |
| Dibutyl phthalate | 2.0 |
| Ester gum | 20.0 |
| Toluene | 60.0 |
| | 128.0 |

Although the above examples are limited to the use of liquid petrolatum as the non-solvent softener, we desire to have it understood that other materials may be used, such as solid petrolatum or petroleum jelly, other hydrocarbons, and materials that are predominantly hydrocarbons. The necessary characteristics of such materials are that they are high boiling, viscous products which are non-solvents for cellulose ether and which are immiscible with water. We prefer, for this purpose, those products which are viscous liquids at normal temperature, which are not too highly colored, and which have a boiling range above 200° C. and a melting range below 80° C. An excellent material for this purpose, as indicated above, is liquid petrolatum which is a petroleum distillate usually having a napthenic base, but sometimes having a paraffin base and sometimes a paraffin-olefin base. We prefer distillates having a boiling range above 200° C. but for most purposes we prefer a distillate boiling between 300° and 400° C. and melting below 50° C. For some purposes we may use higher boiling fractions, such as solid petrolatum or petroleum jelly. These higher boiling fractions, however, tend to form slow drying or even sticky films and hence are only suitable in those cases where quick-drying is not essential.

We find that the product obtained by combining cellulose ether with a non-solvent softener tends to give films which are water resistant but which may be more or less hazy and, therefore, unsuitable for some requirements. To overcome this haziness, we replace a portion of the non-solvent softener with a solvent softener and for this purpose we use a solvent for cellulose ether which is compatible with the non-solvent softener and which has a low vapor pressure at normal temperatures. As indicated in the above examples, suitable solvent softeners are dibutyl phthalate and benzophenone, but other solvents, such as acetyl laurin, or combinations of solvent softeners, may be used.

By acetyl laurin we mean to designate a mixed glyceryl ester of acetic acid and lauric acid. We include under this designation, also, a mixed glyceryl ester of acetic acid and acid obtainable by the hydrolysis of coconut oil. Such a mixed ester may contain, in addition to acetyl laurin, various proportions of other glycerides, for example, acetyl palmatin, acetyl myristin and the like. Acetyl laurin, suitable for our purpose, may be prepared by methods described in U. S. Patent 1,558,299, issued to George L. Schwartz, October 26, 1925.

If all of the softener is solvent softener, the degree of waterproofness is low. The addition of any amount of non-solvent softener improves water resistance, but this is most apparent where the ratio of non-solvent softener to solvent softener is greater than 50:50, and a preferred ratio is 80:20.

The ratio of composite softener to cellulose ether may be varied over a wide range, depending upon the desired characteristics and intended use of the resulting composition, although we prefer to maintain a ratio of from .4 to 4 parts of composite softener to 10 parts of cellulose ether.

Any solvent or mixture of solvents for the cellulose ether can be used provided they are miscible in all proportions with the non-solvent softener that is employed. Examples of other suitable solvents are hydrocarbons, such as benzene, xylene, and gasoline, organic chlorine compounds, esters of the common alcohols, such as ethyl acetate, ethyl alcohol, and mixtures of solvents. While ethyl acetate and ethyl alcohol are not satisfactory for use alone with petrolatum, they are satisfactory when utilized in solvent mixtures which are predominantly hydrocarbons.

To improve the build and gloss of the film, we may add to the compositions described above various natural or synthetic varnish resins, including Congo, rosin, rosin ester, kauri, and the like. We may use these resins in various proportions up to 100% or more of the weight of the cellulose ether. In addition we may add other ingredients, such as pigments, oils, driers, and thinners, as required for the various specific purposes of the arts, such as plastics, molding compounds, and various coating compositions, such as varnishes, lacquers, enamels, insulating compositions, waterproofing compositions, and compositions suitable for making artificial leather and the like.

Other cellulose ethers may be used in place of ethyl cellulose if desired.

It will therefore be apparent that we have produced new and useful cellulose ether compositions which may be employed for a wide range of purposes and which possess improved toughness and resistance to water penetration.

As many apparently widely different embodiments of this invention may be made without departing from the spirit and scope thereof, it is to be understood that we do not limit ourselves to the specific embodiments thereof except as defined in the appended patent claims.

We claim:

1. A new composition of matter comprising 10 parts by weight of a cellulose ether combined with from .5 to 4 parts by weight of a composite softener therefor, the composite softener comprising petrolatum having a boiling range above 200° C. and a melting range below 80° C. as a softener therefor and a substantially non-volatile solvent for the cellulose ether compatible with the petroleum distillate.

2. A coating composition comprising 10 parts by weight of a cellulose ether, from .5 to 4 parts by weight of a composite softener therefor, and a volatile solvent for the cellulose ether and the composite softener, said composite softener comprising a petroleum distillate boiling between 300° and 400° C. and a cellulose ether solvent compatible with the petroleum distillate and having a low vapor pressure at normal temperatures.

3. A coating composition comprising a cellulose ether, a varnish resin, a composite softener for the cellulose ether and a volatile solvent for the cellulose ether, the varnish resin and the composite softener, said composite softener amounting to from 4-40%, by weight of the cellulose ether, and comprising petrolatum having a boiling range above 200° C. and a melting range below 80° C. as a non-solvent softener and a substantially non-volatile cellulose ether solvent compatible with the non-solvent softener.

4. A water-resistant composition comprising 10 parts by weight of ethyl cellulose and from 0.4 to 4.0 parts by weight of petrolatum having a boiling range between 300-400° C. and a melting range below 50° C. as a softener therefor.

5. A coating composition comprising 10 parts by weight of cellulose ether and from 0.4 to 4.0 parts by weight of a composite softener therefor, said composite softener comprising petrolatum having a boiling range above 200° C. and a melting range below 80° C. and a solvent softener from the group consisting of dibutyl phthalate, benzophenone, and acetyl laurin.

6. A coating composition comprising 10 parts by weight of a cellulose ether and from 0.4 to 4.0 parts by weight of a composite softener therefor, said composite softener comprising petrolatum having a boiling range above 200° C. and a melting range below 80° C. as a non-solvent softener and a solvent softener from the group consisting of dibutyl phthalate, benzophenone and acetyl laurin, the proportion of non-solvent softener to solvent softener, by weight, being greater than 50:50.

7. A coating composition comprising 10 parts by weight of a cellulose ether and from 0.4 to 4.0 parts by weight of a composite softener therefor, said composite softener comprising about 80 parts by weight of petrolatum having a boiling range above 200° C. and a melting range below 80° C. as a non-solvent softener and 20 parts by weight of a solvent softener from the group consisting of dibutyl phthalate, benzophenone and acetyl laurin.

8. A coating composition comprising 10 parts by weight of ethyl cellulose and from 0.4 to 4.0 parts by weight of a composite softener therefor, said composite softener comprising about 80 parts by weight of petrolatum having a boiling range between 300-400° C. and a melting range below 50° C. and 20 parts by weight of dibutyl phthalate.

In testimony whereof we affix our signatures.

WILLIAM W. LEWERS.
GEORGE L. SCHWARTZ.